(12) United States Patent
Bermudez et al.

(10) Patent No.: US 7,954,820 B2
(45) Date of Patent: Jun. 7, 2011

(54) MIXED MEDIA GAME AND METHODS

(75) Inventors: Melissa Ines Bermudez, New York, NY (US); Golan Levin, Staten Island, NY (US)

(73) Assignee: Melissa Ines Bermudez, New York, NY (US)

( * ) Notice: Subject to any disclaimer, the term of this patent is extended or adjusted under 35 U.S.C. 154(b) by 1491 days.

(21) Appl. No.: 10/841,524

(22) Filed: May 10, 2004

(65) Prior Publication Data
US 2005/0272493 A1   Dec. 8, 2005

(51) Int. Cl.
*A63F 13/00* (2006.01)
(52) U.S. Cl. ......... 273/237; 273/238; 273/288; 463/30; 463/31; 463/34
(58) Field of Classification Search ...... 463/37, 463/30, 31, 34; 273/238, 237, 242, 288
See application file for complete search history.

(56) References Cited

U.S. PATENT DOCUMENTS

| | | | | |
|---|---|---|---|---|
| 4,279,421 A * | 7/1981 | Tepoorten et al. | ............ | 273/237 |
| 4,341,385 A | 7/1982 | Doyle et al. | ............ | 273/237 |
| 4,545,582 A | 10/1985 | Andrews | ............ | 273/238 |
| 5,120,065 A | 6/1992 | Driscoll et al. | ............ | 273/237 |
| 5,251,904 A * | 10/1993 | Cruz | ............ | 273/243 |
| 5,462,281 A * | 10/1995 | Gaito et al. | ............ | 273/238 |
| 5,511,980 A | 4/1996 | Wood | ............ | 434/169 |
| 5,759,100 A * | 6/1998 | Nakanishi | ............ | 463/37 |
| 5,799,939 A | 9/1998 | Schneider | ............ | 273/138.1 |
| 5,853,327 A * | 12/1998 | Gilboa | ............ | 463/39 |
| 5,916,024 A | 6/1999 | Von Kohorn | ............ | 463/40 |
| 5,997,304 A | 12/1999 | Wood | ............ | 434/169 |
| 6,061,052 A | 5/2000 | Raviv et al. | ............ | 345/180 |
| 6,159,101 A * | 12/2000 | Simpson | ............ | 463/46 |
| 6,209,872 B1 | 4/2001 | Caswell | ............ | 273/244.2 |
| 6,373,464 B1 | 4/2002 | Raviv et al. | ............ | 345/156 |
| 6,422,942 B1 * | 7/2002 | Jeffway et al. | ............ | 463/31 |
| 6,460,851 B1 * | 10/2002 | Lee et al. | ............ | 273/238 |
| 6,547,628 B1 | 4/2003 | Long | ............ | 446/227 |
| 6,608,618 B2 | 8/2003 | Wood et al. | ............ | 345/173 |
| RE38,286 E | 10/2003 | Flowers | ............ | 178/18.01 |
| 6,641,401 B2 | 11/2003 | Wood et al. | ............ | 434/159 |
| 6,661,405 B1 | 12/2003 | Flowers | ............ | 345/173 |
| 6,668,156 B2 | 12/2003 | Lynch et al. | ............ | 434/317 |
| 6,954,199 B2 * | 10/2005 | Soto et al. | ............ | 345/173 |
| 7,115,031 B2 * | 10/2006 | Miyamoto et al. | ............ | 463/1 |
| 7,212,308 B2 * | 5/2007 | Morgan | ............ | 358/1.18 |
| 7,445,549 B1 * | 11/2008 | Best | ............ | 463/32 |
| 2002/0111216 A1 * | 8/2002 | Himoto et al. | ............ | 463/43 |

(Continued)

OTHER PUBLICATIONS http://www.hasbro.com/common/instruct/clueins.pdf.*

(Continued)

*Primary Examiner* — James S McClellan
(74) *Attorney, Agent, or Firm* — Haynes and Boone, LLP

(57) ABSTRACT

A gaming article that includes a sensing layer, a non-metallic electroluminescent layer disposed over a portion of the sensing layer, a story layer that is at least substantially transparent and depicts a game board thereon, wherein the story layer is disposed over a portion of the electroluminescent layer, and a sensing device that interacts with the sensing layer when it is adjacent to the story layer and transmits light therethrough from the electroluminescent layer to a player to facilitate display of relevant information. Also included are methods of playing a game, preferably a mystery game, using the gaming article.

26 Claims, 4 Drawing Sheets

U.S. PATENT DOCUMENTS

| | | | |
|---|---|---|---|
| 2002/0197589 A1 | 12/2002 | Wood et al. | 434/201 |
| 2003/0016210 A1 | 1/2003 | Soto et al. | 345/173 |
| 2003/0139113 A1 | 7/2003 | Wood et al. | 446/175 |
| 2003/0162162 A1 | 8/2003 | Marggraff | 434/410 |
| 2003/0198928 A1 | 10/2003 | Lynch et al. | 434/317 |
| 2003/0218604 A1 | 11/2003 | Wood et al. | 345/204 |

OTHER PUBLICATIONS

Mandryk, R.L. et al., "Supporting Free Play in Ubiquitous Computer Games," EDGE Lab, School of Computing Science, Simon Fraser University, Burnaby, British Columbia V5A 1S6, Canada (2001).

* cited by examiner

MIXED MEDIA GAME AND METHODS

TECHNICAL FIELD

This invention relates to a gaming article including a sensing layer, a non-metallic, electroluminescent layer, a story layer that is at least substantially transparent and depicts a game board thereon, and a sensing device that interacts with the sensing layer and transmits light therethrough, as well as methods of making and using the same.

BACKGROUND OF THE INVENTION

Various types of board games exist that tend to provide social interaction but having game-play that involves only rudimentary mechanics, such as dice rolling, card collecting, and piece movement. These are enjoyed by many people who can gather together for the social aspects of playing a board game, such as Clue® by Parker Brothers or 21 B Baker Street by John N. Hanson & Co., although typically board games are necessarily limited in nature and/or scope by the amount of recreational time that players are willing to devote to playing games. Thus, such games tend not to play well or attract interest if they require cumbersome calculations or lengthy periods of time to play to completion.

In the last 20-25 years, however, computers have provided a new venue for game-playing. These games tend to use the great strength of computers—in number crunching, making hundreds of routine calculations, and the like—to provide for reflex-type arcade games, artificial intelligence-simulating strategy games, graphics, and various others. Examples include Myst® by Cyan Productions, Nancy Drew® by Her Interactive, and the Carmen San Diego® series by Electronic Arts & Broderbund. Computer games also tend to make it easy to save a game for continued play at a later time. The Internet has, for the last several years, permitted multiple players to join in a game, role-play, inhabit the same virtual world, or the like as each player logs in from their respective computer. Computer-based games, however, tend to be played alone or with players in other physical locations, thereby losing the social interactions and benefits that come from people joining together in the same room at the same time. Although some computer games bring people together in the same room, competitive-type computer games either involve people hunching together over a single keyboard at a single monitor or require each player to take a turn while the others move away or even leave the room.

A few such toys and games have been designed that attempt to incorporate interactivity with certain features of games are described below.

U.S. Pat. No. 4,341,385 discloses a game board with tokens for players to pursue an imaginary thief whose location is not apparent on the board but is held in a memory or storage register of a digital computing apparatus. The board contains several types and possible paths of movement between locations, and the location of the thief is periodically moved based on pre-defined rules and player input. The computing apparatus also produces sounds following the thiefs moves, and generates audible sounds indicating success or failure in catching the thief.

U.S. Pat. No. 4,545,582 discloses an electronic board game including a flat translucent surface with a light source, a plurality of playing pieces, and a hand held mover object. The light source is a bulb in series with a reed switch and energy source, and the playing pieces are magnetic in nature. The hand held component contains a magnet to repel the board's surface, and can take the form of a ring, pistol, finger, or any other shape depending on the game logo. The light source is activated by the magnetic flux of the playing pieces as they advance, so as to form a message in the game board surface that is communicated in words or drawings to the player.

U.S. Pat. No. 5,120,065 discloses a talking board game having a board and electronic computer system to provide speech information to players, and cards that can be read by the electronic computer system.

U.S. Pat. No. 5,511,980 discloses an interactive learning device in the form of an open book for toddlers and preschoolers. In one embodiment, the book has three-dimensional alphabet letters received by a card spelling a word; the book receives the card and a speech processor circuit recites the word and sounds the phonic when the correct letters are added. In other embodiments, the book is a simple translator, a math calculator for elementary mathematical operations, and the sounds and names associated with various animals.

U.S. Pat. No. 5,799,939 discloses a device for decoding distorted images from a sheet that includes a reflecting geometric figure. A reflecting surface can be applied to a can to decode an anamorphic image applied on a separate sheet, and a reflecting canister can be used to decode and include a removable top holding images therein and a light source to illuminate distorted images. A game is described using the geometric reflecting pieces to decode commands of the game.

U.S. Pat. No. 5,997,304 discloses a phonics and reading teaching device depicting an arrangement of indicia of the alphabet letters and their associated phenomes. Selection causes the device to generate an audio signal or other response from a speaker, with affirmative acknowledgement when the letters of a word are selected in the correct order.

U.S. Pat. No. 5,916,024 discloses a system and method for evaluating responses to broadcast programs, such as television, and a signal transmitted therewith or time-multiplexed to the television signals. Remote audience members can respond vocally or on a keyboard, and the system can include a NINTENDO or SEGA game.

U.S. Pat. No. 6,061,052 discloses a display pointing device including a housing, optical sensor mounted therein, and processing circuitry receiving output from the optical sensor for identifying a location on the display pointed to by the pointing device, as well as methods for operating the display pointing device.

U.S. Pat. No. 6,209,872 discloses an interactive board game that is played during the inactivity in a sporting event, particularly a televised one, using a game board and several sets of cards dealing with the knowledge of the viewer of the sporting event.

U.S. Pat. No. 6,373,464 discloses a computer input device with a housing in the shape of a magnifying glass having a lens portion and a handle extending therefrom. A detector is mounted in the housing and operable to detect an element displayed on a computer display and to generate a corresponding detection signal and an actuator mounted on the housing. A partially reflective, angularly disposed beam splitter can be used such that a user can observe an image on a computer screen through the beam splitter and the image can be reflected to the detector.

U.S. Pat. No. 6,547,628 discloses a toy including housing, input and output devices, an overlay and a controller. The output device may include an array of light sources, a grid having an array of tubular holes with each hole aligning with the light source where the grid is placed over the array, and a diffuser placed over the grid to collect light emitted from the light sources. The diffuser may be translucent and may include at least a portion covered with an opaque coating. The overlay is moved over the surface and interacts therewith.

Various educational and learning toys are also described in a series of U.S. patents and published U.S. patent applications assigned to Leapfrog Enterprises, Inc., including the following patent documents. U.S. Pat. No. 6,608,618 discloses methods of generating audio output by marking on a sheet in the vicinity of a print element with a marking instrument. Reissue No. 38,286 discloses an electrographic surface position location system and method. U.S. Pat. No. 6,641,401 discloses an interactive apparatus with templates to produce audio output. U.S. Pat. No. 6,668,156 discloses a print media receiving unit including platform and print media, including a stylus operatively coupled to the platform. U.S. Pat. No. 6,661,405 and Publication No. 20030016210 A1 each disclose an electrographic position location apparatus and method that employs an antenna system and a signal strength detector. U.S. Publication No. 20030162162 A1 discloses a write-on interactive apparatus and method. U.S. Publication No. 20030218604 A1 discloses another interactive apparatus using print media.

These apparatuses, games, and learning tools, tend to be more in the nature of learning devices, computer peripheral equipment to assist in playing computer games and the like. Thus, it is desired to provide a game that provides the beneficial social elements of a board game with the interactivity of computer hardware- or software-based components, as well as the equipment and methods of playing such a game.

SUMMARY OF THE INVENTION

The invention encompasses a gaming article including a sensing layer, a non-metallic, electroluminescent layer disposed over a portion of the sensing layer, a story layer that is at least substantially transparent and depicts a game board thereon, wherein the story layer is disposed over a portion of the electroluminescent layer, and a sensing device that interacts with the sensing layer when it is adjacent to the story layer and transmits light therethrough from the electroluminescent layer to a player to facilitate display of relevant information.

The invention also encompasses a method for playing a game with at least one player, where play proceeds by moving a sensing device a predetermined number of spaces on a game board depicted on a story layer of a gaming article that has an associated electronic register, selecting an icon by toggling at least one input device, so as to display information from the electronic register to the player moving the sensing device, repeating the moving and selecting until the player is prepared to make a conclusion, and selecting a concluding icon where the player selects an answer using the sensing device, wherein the electronic register conveys an appropriate reward to the player if the answer is correct.

In one preferred embodiment, the game is played competitively with at least two players alternating in conducting the moving and selecting steps, wherein only one player is able to select the correct answer.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

Figure 1:
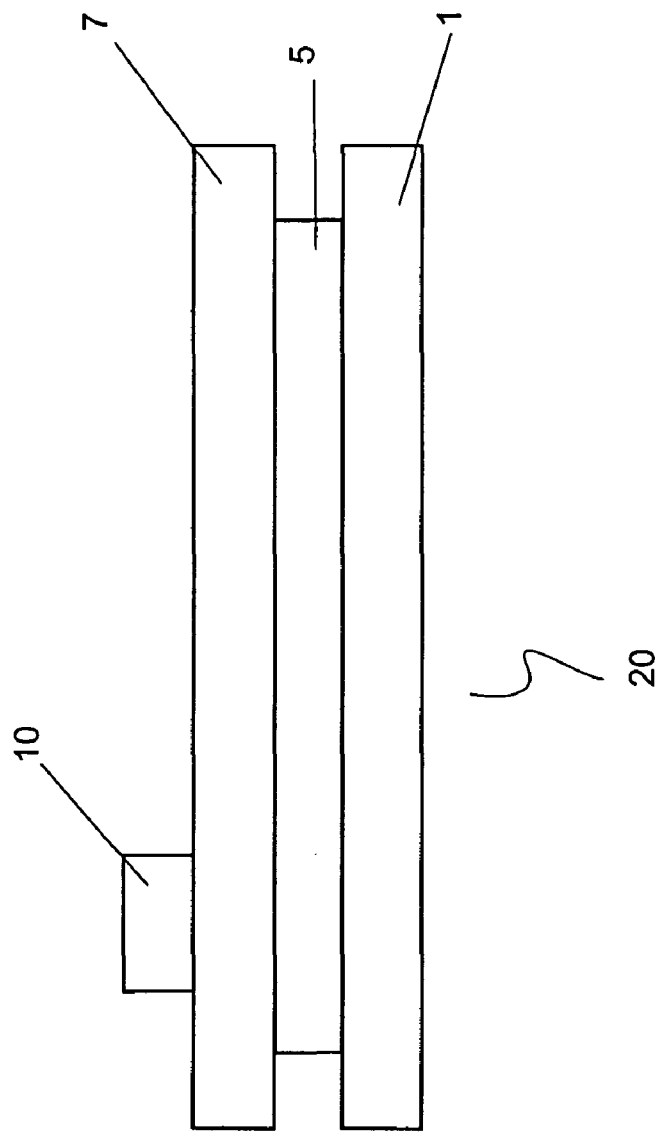
FIG. 1 is a cross-sectional representation of a gaming article according to the invention.

A truly mixed media, interactive game has now been discovered that has the benefits of both board games and computer-assisted games and that can be obtained while minimizing the detractions of each type of conventional game, which tend to deter people from playing games. The gaming article of the invention includes, as shown in FIG. 1, a game board 20 including a sensing layer 1 associated with a sensing device 10 that interacts with the sensing layer 1 when it is sufficiently adjacent thereto, typically with other layers in between. The game article preferably also includes an electroluminescent layer 5 disposed over a portion of the sensing layer 1, and a story layer 7 that is at least substantially transparent and depicts a portion of a story, such as a game board, thereon. The story layer 7 is typically disposed over a portion of the electroluminescent layer 5, which itself is typically over a portion of the adjacent sensing layer 1. The sensing device 10 also transmits light therethrough from the electroluminescent layer 5 to a player to facilitate retrieval of information by the player. Methods of playing such a mixed media/interactive game have also been invented, as described below, and these methods can use this game article as described herein as well as any other suitable type of game article.

The game articles of the invention, and methods of using the same, can advantageously provide face-to-face human interaction, preferably including physical-verbal communication, along with the social and physical activities associated with conventional board games. This can be accomplished while also benefiting from the dynamic, interactive functionality of computers and/or gaining the ability to rapidly resolve calculations, generate random numbers, and the like by operatively associating the game components with computers or other similar electronic equipment.

The game board 20 of the gaming article is generally arranged to have a sensing layer 1 disposed as a base for the other layers. Any base capable of detecting and/or receiving touch, warmth, pressure, light, electric, radio frequency, or magnetic input, or the like is suitable. Preferably the sensing layer 1 is pressure sensitive and is operatively associated with a sensing device 10 that is repeatedly moved or repositioned during use, such as game play. Certain commercially available articles that can be modified to form the sensing layer 1 of the invention, such as pressure-sensitive tablets from Leapfrog Enterprises, Inc. of Emeryville, Calif. or radio frequency-capable tablets from Wacom Technology Corp. of Vancouver, Wash. For example, the pressure sensitive sensing layer can be adapted and configured to include an array of pressure sensitive switches in the sensing surface, such as membrane switches, an array of capacitive or inductive elements whose impedance is altered by bringing the stylus into contact with the surface, or any other suitable apparatus or method available to those of ordinary skill in the art. Another preferred embodiment is a radio frequency transmitting and detecting device in the sensing device 10 and sensing layer 1, respectively, or vice versa. The detected or received information can be converted into positioning or other more useful information by an associated electronic register, such as a computer. It should be understood that the sensing layer can be formed in any suitable manner using any suitable equipment, and the entire contents of the various patent documents assigned to Leapfrog Enterprises, including U.S. Pat. No. 6,608,618; Reissue No. 38,286; U.S. Pat. No. 6,641,401; U.S. Pat. No. 6,668,156; U.S. Pat. No. 6,661,405; U.S. Publication No. 20030016210 A1; U.S. Publication No. 20030162162 A1; and U.S. Publication No. 20030218604 A1, are each hereby expressly incorporated by reference thereto to provide suitable guidance for providing suitable sensing layers according to the present invention.

Any size sensing layer 1 can be adapted for the game article of the invention. Exemplary larger sizes such as about 8 to 20 inches wide by about 10 to 22 inches deep can be used for the game article, particularly when used in a fixed location such as a table, floor, desk, or the like. Exemplary smaller sizes may be preferred for mobile usage, such as during travel, and these sizes can generally be about 3 to 7 inches wide by about 4 to 8 inches deep.

The electroluminescent layer 5 that is preferably disposed over a portion of the sensing layer can be any suitable material or device capable of transmitting light, provided that it does not significantly interfere with the sensing layer 1 and its operatively associated sensing device 10. Generally, metallic materials tend to cause disruption between the sensing layer 1 and sensing device 10, and therefore, non-metallic materials are preferred. The electroluminescent layer 5 is preferably paper-like in nature, and can be made of any suitable polymer, plastic, or paper. The electroluminescent layer is preferably at least substantially flat, or entirely flat, such as a sheet of paper or cardboard. Preferably, when activated, the electroluminescent layer 5 provides light at least in one direction toward the user or player.

The story layer 7 is typically disposed over a portion of the electroluminescent layer 5, which itself is typically disposed over at least a portion of the adjacent sensing layer 1. The story layer 7 is at least partially, and preferably substantially, transparent and depicts a portion of a story, such as a game board, thereon. The story layer should be sufficiently transparent to pass sufficient light from the electroluminescent layer 5 to the user so that the printed or other informational materials on the story layer 7 are also visible and legible to the user. A preferred printing material includes ink, toner, or the like, and any suitable color or combination thereof may be used. The electroluminescent layer 5 is preferably disposed over a sufficient portion of the sensing layer 1 and under a sufficient portion of the story layer 7 to illuminate any important information on the story layer 7 to facilitate viewing by the user.

The story layer 7 may contain any scene or location to provide a suitable locale for the game article. The story layer 7 can preferably be a transparency including printed material thereon regarding the locale of the game. Preferably, the story layer 7 is replaceable so that it may be removed and replaced if damaged, or even between games or during games to provide for various gaming possibilities. The story layer can depict a story, plot, theme, or the like, and related details, including historic, present day, or futuristic; fictional or factual; or the like. For example, in a role-playing game, the initial story layer might include materials related to a town, and subsequent story layers may include dungeons, wilderness areas, castles, or the like. For a racing-type or exploratory-type game, the initial story layer may include various maps such as underwater, topographical, actual geography, real or fictitious planets or stars, space itself, etc. The story layer 7 can be adapted and configured to include various vehicles or locations including one or more trains, airplanes, boats, cars or trucks, or the like, in any combination, to depict a space in which players move. In one preferred embodiment, the story layer 7 depicts a train or other scene of a mystery to be solved, such as a murder. Also, since the story layers 7 are at least partially transparent, they may also be stackable, so that additional story layers 7 may be added onto previous layers to illustrate discoveries or provide the scene of subsequent chapters in the story.

The operatively associated sensing device 10 can include a stylus that can transmit information from the player to the sensing layer 1, and from the sensing layer 1 to the player. Although the sensing device may optionally but preferably contain an electronic register with any necessary instructions and information for game play, in a preferred embodiment the sensing device is remote and operatively associated with an electronic register, such as a computer, that is separated from the game article by a few feet or even a room or two away. When the sensing device is associated with an electronic register, it may be connected by wires or it may be wireless. In any wireless embodiment, any suitable device or method of transmitting to, and optionally but preferably receiving transmissions from, the electronic register may be included. For example, the transmitter might include Bluetooth capabilities or any other local radio frequency or infrared transmission and receiving capabilities. It is also possible that the electronic register and sensing device are a single package or stand-alone unit that can include any necessary features that an external or remote computer might provide as described herein, e.g., a CD-ROM or DVD-ROM reader to load new software, a cartridge slot for electronically associated add-on or supplemental software to be introduced, speakers, or the like. Use of a single package including the game board having a story layer, electroluminescent layer, sensing layer assembled together with an electronic register permits maximum portability and is preferred in for portable or travel versions of the game device described herein. In one preferred embodiment, a single electronic register is associated with the sensing layer and either the sensing device or the visual component.

The sensing device 10 is typically adapted and configured so that players may readily grab it and move it, such as by sliding or preferably lifting so it can be placed on the appropriate location on the story layer each time a player takes a turn. The sensing device 10 preferably includes a visual component to permit information to be visually displayed to the user, e.g., the game player. The sensing device typically includes a frame around the visual component, and a handle is typically associated therewith. Preferably, an audio component is also included on the sensing device 10 or operatively associated therewith, such as associated with the electronic register itself, e.g., a pre-existing sound system on a home computer. Thus, the frame or handle may include a speaker component. The visual component can be any suitable mechanism to do so, but is preferably an LCD screen.

The visual component of the sensing device is preferably arranged and configured to provide private, or secret, information to the player using the device, while the game board as a whole is generally arranged and configured to provide public information to all players at the same time. This can advantageously permit various game-playing tactics including bluffing, player manipulation, concealment of critical information, and the like.

Regardless of the visual component, it may preferably include a removable polarizing filter, which can permit the player to see the information on the visual component. Alternatively, one or more different physical or even virtual filters may be used in connection with the sensing device and visual component that can provide different effects, such as simulating different surveillance and evidence illumination techniques including x-ray vision, blacklight, infrared thermography, nightvision, fingerprint powder, telescopic lens or binoculars, or the like. The filter can be physically disposed adjacent to the visual component such as by having each player insert it horizontally in a slot on the sensing device 10, or it can be a virtual filter provided with the metallic cards or operated by the sensing device. The sensing device preferably includes a frame, which helps hold the visual component and advantageously is configured and dimensioned to inhibit or prevent persons other than the player from snooping and seeing the game information meant for a different player while the player takes his or her turn. The frame can thus act as a shield that rises above the level of the visual component to help keep information private for the player operating the sensing device.

Preferably, the LCD screen is connected to an electronic register, such as a desktop or minitower computer, laptop computer, or other commercially available home gaming console. A suitable LCD screen size might be about 2 to 3 inches in size up to about 4 to 6 inches in size. In a preferred embodiment, the sensing device 10 is configured to include an LCD screen connected to a computing device and to have the appearance of a magnifying glass that includes the sensing portion associated with the sensing layer 1. In one embodiment, the LCD screen has all active lighting capabilities removed, not present, or disconnected, to inhibit or prevent non-users from viewing the information thereon when disposed adjacent to the story layer 7. The back of the LCD can be removed to increase transparency therethrough of lighting from the electroluminescent layer. Thus, the sensing device can also preferably transmit light from the electroluminescent layer through itself and its viewing component to a player, so as to facilitate retrieval of information by the player so the player can better view the information on the visual component, e.g., LCD screen, of the sensing device 10.

The sensing device also preferably includes at least one input device that signals for information to be displayed for the player using the sensing device, and optionally, includes a decorative overlay that has a complementary theme with the story layer. This input device is typically a button, scroll wheel, track ball, or the like. In one embodiment, the sensing device is a conventional computer mouse adapted to have an LCD screen disposed in a central location of the mouse. It should be understood that each part of the game article can be modified or adapted for a different story. The sensing device 10 could be adapted and configured to appear, for example, as any type of inspecting device. Exemplary appearances for the sensing device 10 include a magnifying glass, a pair of glasses, goggles, a microscope, binoculars or telescope, or the like. The sensing device 10 can also be a black or otherwise neutrally decorated article, and the artwork or decorative appearance can be provided electronically as part of the LCD screen or other visual component of the sensing device 10.

The sensing device 10 and story layer 7 are preferably decorated either electronically or physically, or both, with a complementary theme. For example, in a preferred embodiment, the story layer 7 is a mystery scene and the sensing device 10 is decorated as a magnifying glass. Any of a variety of complementary themes can be used or included depending on the story line or essential plot or story of the game to be played. For example, an underwater-type story layer 7 can have a goggle-appearance sensing device 10, a sports-related story layer 7 can include aviator glasses-appearing sensing device 10, and so on. Alternatively, the story layer 7 can include a map or any of the other possibilities discussed herein or otherwise suitable for depiction in a game, and the sensing device 10 can be decorated to appear (either physically or electronically) as a vehicle that can move across the map or other story layer 7. For example, a race car sensing device 10 can be used with a racing-type game having a map or maps as the story layer 7, a ship 10 can be used for an at-sea adventure depicting underwater or water-based sites on the story layer 7, or the like. In a preferred embodiment, illustrated in FIG. 4, the sensing device 10 has the physical appearance of a magnifying glass while the story layer 7 is a train with various compartments.

In an alternate embodiment, the sensing device 10 can be more passive, such as a sheet of glass, plastic, or other sufficiently and preferably substantially transparent material. An exemplary passive sensing device 10 might include a conventional magnifying glass or other suitable "lens" through which a player might receive information. The sensing device 10 may optionally but preferably include a removable polarizing filter. In this embodiment, the information is provided to the player through a more active game board 20 that includes the visual component and a sensing portion, which can be a sensing layer. For example, a visual component can be substituted for the electroluminescent layer, story layer, or preferably both. The visual component in the game board itself can include or be a large LCD screen or any other suitable visual component, optionally but preferably with the polarizing filter removed. The visual component is preferably at least substantially horizontal so that cards, playing pieces, and dice disposed thereon during game play are inhibited or prevented from sliding.

In a preferred embodiment, the entire game board 20 is a large LCD screen disposed at least substantially, and preferably completely, horizontally over a portion of a sensing layer. The visual component and sensing layer are generally adjacent to facilitate operation of the sensing layer and the sensing device employed during game play. Preferably, the visual component is sufficiently thin that the sensing layer and sensing device on opposite sides thereof can suitably interact. This embodiment simplifies the need for a game device with three internal layers. In this manner, only the player operating the sensing device with the optional but preferred polarizing filter therein will be able to readily receive information displayed on the game board 20, i.e., the polarizing filter can be in the visual component or the sensing device and the electronic register displays information in a complementary fashion, typically to limit distribution of certain player-specific information to the player operating the sensing device. In another preferred embodiment, the sensing layer 1 detects the sensing device 10 and displays information only in a location that will be within a viewing area of the sensing device 10.

Figure 4:
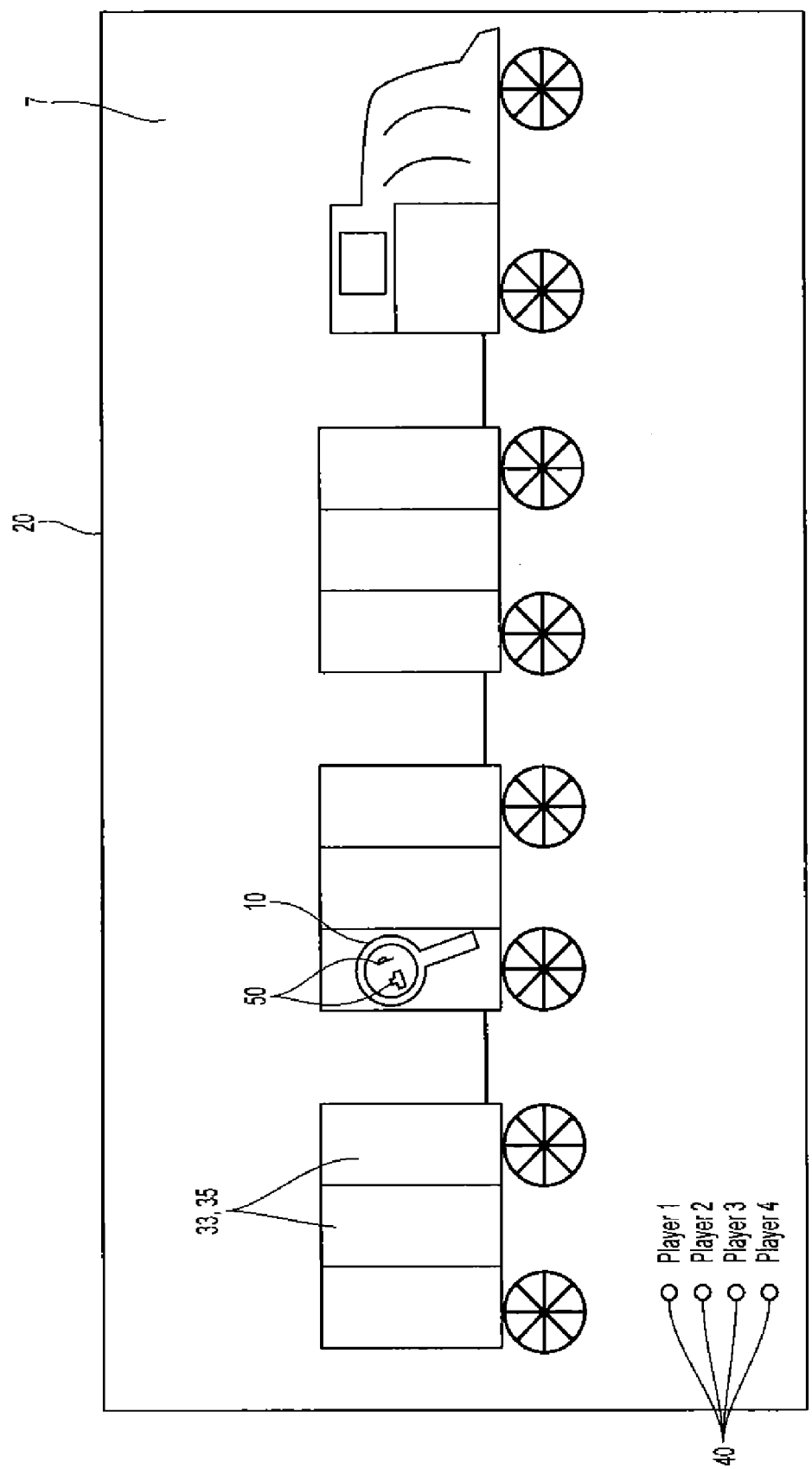
FIG. 4 is a preferred example of a sensing device in relation to a game board.

The game board 20 can be held together in any suitable manner. It can be integrally formed, or held together with any suitable fastener, such as edge clips, snap-together portions, corner clips, glue or other adhesive component(s), or any other combination thereof. Preferably, the story layer is disposed over the remainder of the game board 20 so it can be readily replaced or exchanged, e.g., without fastener(s) or with a readily removed fastener. The game board 20 itself may be integrally formed as part of a gaming table, or adapted to be fastened to a gaming table (not shown). Preferably, the assembled game board 20 has the appearance of a board game, although in some embodiments with one or more wires protruding therefrom preferably in a discrete, safe manner to connect to the electronic register 25. Optionally, as seen in FIG. 4, multiple buttons 40 can be provided so that each player can trigger a button or, preferably, their color button, on the game table, on an adjacent computing device, or any other suitable trigger to inform the electronic register or computing device that the next player is now active.

Figure 2:
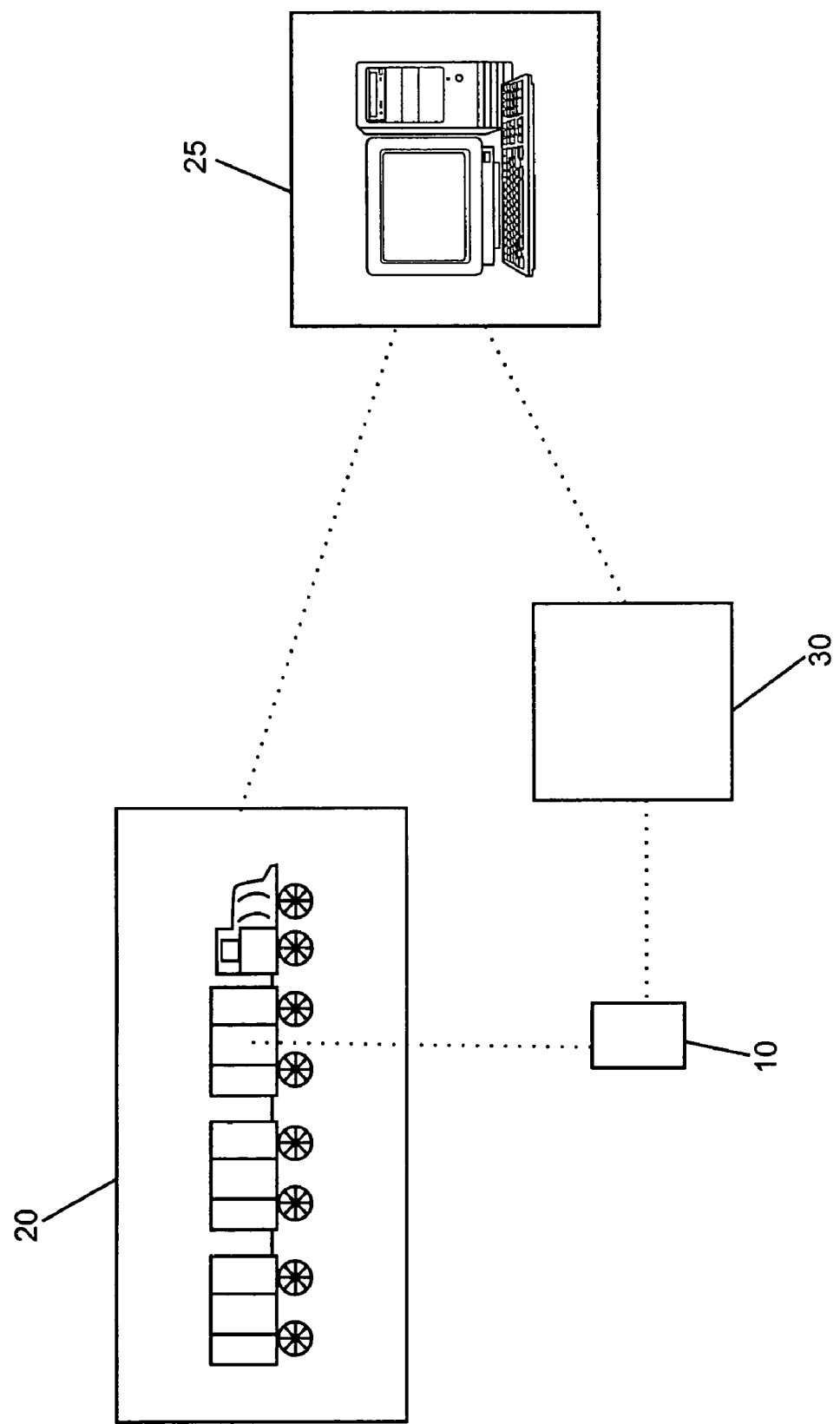
FIG. 2 is a schematic of an arrangement of the game article including a separate electronic register according to the invention.

FIG. 2 illustrates a schematic view of various components in or associated with the gaming (or game) article, which can be used for the methods of playing a game. The gaming article shown in FIG. 2 includes a game board 20 including at least the various components described above and the sensing device 10. The game board 20 is preferably operatively associated with an electronic register, such as a computing device 25. Preferably, the electronic register 25 and sensing layer 1 operate in conjunction to determine the location of the sensing device 10 when adjacent to the game board 20. Thus, in a preferred embodiment, the sensing device 10 is also operatively associated with an electronic register, preferably the same electronic register 25. All associations may be wired or wireless, as previously discussed. The visual component circuitry, optional programmable logic control (PLC) 30, or both, required to coordinate and display the player-specific information on the visual component of the sensing device 10 can be within or adjacent to the sensing device 10, but is preferably remotely located such as a short distance of a few inches or feet away or in a nearby room. This circuitry 30 is operatively associated with the sensing device 10 and the optional but preferable electronic register 25, and typically the circuitry provides an electronic interface between the sensing device 10 and the electronic register 25. In this preferred embodiment, the circuitry to run the PLC, visual component, or preferably both, is disposed separately from the sensing device 10 so as to minimize the size of the sensing device 10. Thus, preferably, as much circuitry or electronics 30 as possible needed to operate the sensing device 10 is disposed adjacent the game board 20, such as built into a storage case for the game board 20 or a game board support (not shown), between the sensing device 10 and electronic register 25, such as in the manner many power adapters are disposed between each end of its connecting cords, or even adjacent the electronic register 25, such as on a table supporting the electronic register 25 or on the floor adjacent thereto.

Figure 3:
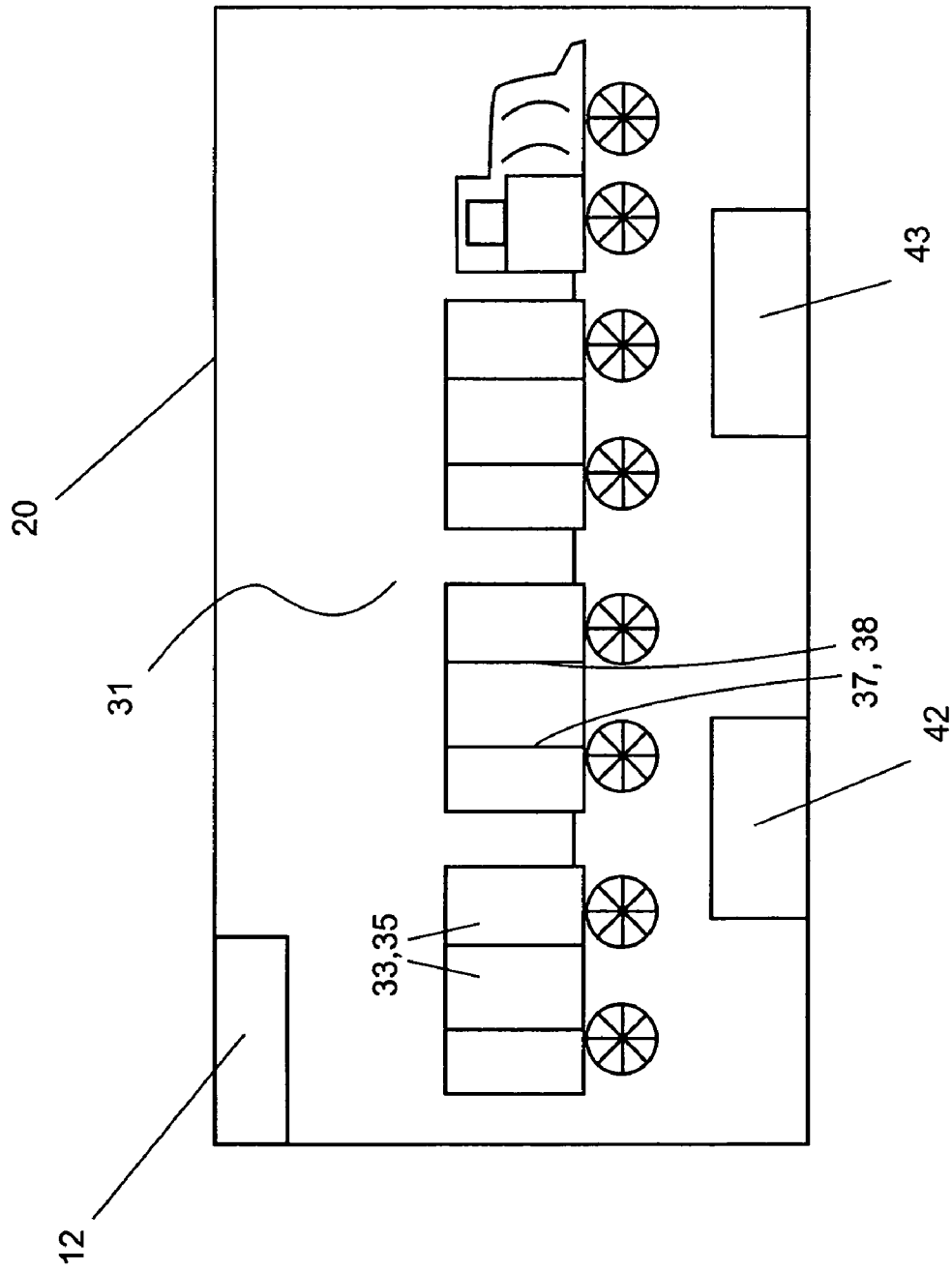
FIG. 3 is an example of a story layer depicting a train locale according to the invention.

FIG. 3 shows the story layer 7 of a game board 20 having a locale 31 or theme. The locale 31 is preferably split into separate zones for movement of player pieces, in this case separate compartments 33, 35 of a train. The game board typically depicts a plurality of lines or other separators 37, 38 to distinguish between zones for movement of player pieces in which game play occurs. During game play, each compartment contains clues or other information or articles, however, these are typically stored in the electronic register associated therewith, and the clues or information or articles are shown to each player only during their turn and under certain circumstances described herein. A logo may be placed on the game board in the logo space 12, such as a company name or game name. This logo space 12 may be disposed at any suitably large location on the game, e.g., on the train engine, across the top middle, on the bottom, etc. The game board preferably thus includes further depictions with a combination of alphanumeric characters, pictures, or both, such as the front part of the train engine, wheels, or the like that are for aesthetic purposes to help generate the locale or theme but do not necessarily impact on game play.

The gaming article preferably further includes a plurality of player position markers, such as of suitably different colors so that each player can distinguish his or her piece, and at least one die to be rolled for indicated how far each player is permitted to move. The gaming article preferably further includes a plurality of metallic cards. These metallic cards can be employed during game play to either interfere with the sensing layer and sensing device sufficiently to block a signal therebetween when disposed on the story layer; or complete a circuit when placed into a suitable register connected to the sensing layer, sensing device, adjacent the game board, or any combination thereof. These can be called snoop cards and lock cards, for example. These metallic cards can be of any suitably conductive metal, and can be of any suitable size. The size is preferably commensurate with the size of the game board and sensing device 1, but the cards are at least about 0.5 by 1 inches in size if rectangular in nature or at least about 0.75 inches in diameter if circular so that they are sufficiently large to facilitate grasping by players having small motor control difficulties.

Preferably, software is installed on the electronic register 25 that facilitates operation of the sensing device 10 or sensing layer 1, or more preferably, both. A person (either the same or a different person) can select a story layer that correlates to a particular story and places it on a sensing layer used in connection with the sensing device before the at least one player begins moving the sensing device. Input is provided to the software so it can determine which story layer is being used and therefore which complementary story to implement. The software can be adapted and configured for use by one or more players, and with one or more stories or chapters of a story, each of which contains a different theme, information, conclusion, or the like. Advantageously, the software is arranged to provide randomness to the mystery so that the game is infinitely or multiply replayable with a different conclusion so that players retain the element of surprise when repeatedly playing the game.

The game play can occur with at least one player, although preferably two or more people play to facilitate the human interaction typically lacking in conventional computer-based games. The play generally proceeds as follows: moving a sensing device a predetermined number of spaces on a game board depicted on a story layer of a gaming article that has an associated electronic register, selecting an icon by toggling at least one input device, so as to display information from the electronic register to the player on the sensing device, repeating the moving and selecting until the player is prepared to make a conclusion, and selecting a concluding icon where the player selects an answer using the sensing device, wherein the electronic register conveys an appropriate reward to the player if the answer is correct.

Game play can typically proceed as follows: a player optionally presses a triggering device such as a button on the sensing device or a triggering device adjacent the game board or on the electronic register to indicate it is the next player's turn, following which the player rolls the die or dice, moves across the game-board according to predetermined rules, and then moves the sensing device over that location to reveal one or more clues. The board game is illuminated so that players can see the visual component of the sensing device. Players can insert an optional, or optionally removable, polarizing filter into the sensing device to permit them to see the visual component, which can increase the aura of mystery when the story involves a mystery. Each player also receives various metal cards that can be used during game play as noted herein. As each clue is selected, the associated electronic register or computing device displays a matching clue. A reminder such as a clue number can also be displayed to facilitate players remembering or reviewing their clues. The sensing device can also permit players the option of selecting a clue or reviewing previous clues each time they take a turn.

The predetermined number of spaces can be randomly generated by the associated electronic register or computer, but preferably is obtained when the player rolls one or more dice. The sensing device including visual component displays one or more icons depending on which compartment the player lands on, and the electronic register electronically feeds this information to the sensing device and displays it for the active player (i.e., the one taking a turn). A compartment preferably can contain one to five icons, which can be for example a clue icon, an object icon, or any combination thereof. The clue may be visual or audio. It is possible to arrange the clues to be randomly displayed or played within each compartment so that players need only move the sensing device over a compartment upon which their piece landed and no need for further input is required. These sounds can also be adapted to correspond to visual clues like a mini-magnifying glass displayed in the sensing device, which only the active player taking a turn can select and see. Another icon may be a smokescreen, so that if a player selects it this can smoke out the room for a period of time or number of turns so other players or no players can see any icons or receive any clues when landing on that room or playing space, e.g., compartment. Yet another icon might be a normal looking icon, but ultimately prove to be a red herring that is important-sounding information that is incorrect or even useless. Certain icons can be arranged to be hidden in a compartment and simply appear as furniture until another clue suggests that a player check back to a previously visited compartment containing these clues. Any of a variety of other clues or icons can be used to provide varying game play or add flourishing details on different stories in different locales.

The concluding icon can be text or a visual clue that permits the player to guess at the final answer or otherwise take a final action. The appropriate reward conveyed can be an audio track, visual display, or preferably a combination thereof. It can be, for example, victory music or sounds (e.g., the "Stars and Stripes" or the National Anthem), music or sounds adapted to the theme or locale of the game (e.g., a train pulling into a station), or the like, or any combination thereof. The text can confirm the correctness of a guess and offer additional congratulations through appropriate words or images. The gaming article can also be arranged on a more difficult setting, preferably through the software, so that only a single answer is permitted or that a certain amount of time or turns must pass before that player is permitted to attempt to select a concluding icon and win. If the player is incorrect, the music, sound, or visual text or images can be insulting, negative, or any other suitable punishment, such as a noise of a plane stalling or a train crashing or derailing. Preferably, the game is played competitively with at least two players alternating in conducting the moving and selecting steps, wherein only one player is able to select the correct answer. This is typically the first player to find a key clue or article, such as the murder weapon.

In one embodiment where a train is the locale, the conductor's compartment is the location that must be reached so that a player has an opportunity to select the concluding icon. This can be arranged on more difficult settings so that the concluding icon will not appear before that player finds the key clue or object, e.g., a murder weapon. Difficulty settings can also be used via the electronic register or software thereon to activate and control the timer and length of time available, to make clues easier or harder, and the like. These are typically preset with each story so that players need not modify every little detail when playing. Custom settings can optionally but preferably be included so that players can arrange the game or story with some personal details or settings for repeated playing. For example, with more than 2 players, if the first player guesses the answer incorrectly, they lose and the remaining players continue until the correct answer is reached. When two or fewer players remain, the game can be arranged so that the players keep going until the correct answer is guessed so that a winner can ultimately be declared.

Generally, game play is regulated by an optional but preferred associated electronic register, which preferably includes a computer associated with at least the sensing device of the gaming article. When an electronic register such as a computer is included with or to be used by the gaming article, a person preferably installs software containing instructions for the associated electronic register before the at least one player begins moving the sensing device. The instructions can also teach a player—or preferably all players at the same time—how to play the game through verbal instruction and optionally also with visual instruction for the player adjacent the sensing device. The players can thus control the level of game playing detail is initially provided, thereby permitting more details to be examined at a later time or date, such as during game play. Preferably, a person selects a story layer that correlates to a particular story and places it on a sensing layer used in connection with the sensing device before the at least one player begins moving the sensing device. The software loaded in the computer or other electronic register, or selected from a menu in the software, preferably corresponds to the story layer so the clues and displayed information make sense and correlate to each other. It is possible that the software includes a plurality of stories, and that various story layers each include a location such as logo space 12 that is contacted initially when play begins to inform the software which corresponding story to implement. Different story layers can include this logo space 12 in a different location, so that the software can be pre-arranged to know which story layer is in place based on the initial location contacted on the sensing layer 1.

As illustrated in FIG. 4, during game play, the information displayed to each player is determined by a combination of the at least one input device and the location of the sensing device 10 in relation to a sensing layer disposed adjacent to the story layer 7. Thus, depending on the location of the sensing device 10, e.g., which compartment 33, 35 or playing zone it is disposed over, certain information such as icons 50 will be displayed on the visual component of the sensing device 10. It is possible for an adjacently disposed electronic register or computing device to act as the visual component, so that large images can be displayed for all players or solo play. Preferably, the visual component in the sensing device 10 is employed in competitive multiplayer play so as to inhibit other players from seeing the active player's information. The input device is then used by the active player to select a particular icon or clue 50, and the associated electronic register or computing device can display the selected, relevant information for that player. Concurrently or before each player's turn, the electronic register determines which player of a plurality of players is selecting the icon 50 so it can display all information previously determined by that same player when the sensing device 10 is moved by that player across the previously visited locations on the game board 20. This permits a player to review all previously learned information to facilitate arriving at a conclusion to the game, e.g., solving a mystery.

The game play can be timed to provide additional suspense and goad the players into making rash decisions. A timer can be included to count down a predetermined amount of time until the answer is selected by a first player, who must do so before the timer concludes the countdown. The timer can be a separate timer, such as an hourglass or clock or countdown timer, or it can be displayed on the adjacent computing device or electronic register, or it can be displayed on the visual or audio component of the sensing device.

Each player can optionally, but preferably, receive one or more modifying cards that, when used in connection with the moving and selecting steps, can either block information in a compartment from being displayed or permit that player to see confidential information obtained by another player. These cards can be the metallic cards discussed herein, and they can be used by placing them on or in optional slots 42, 43. One slot can be adapted and configured for blocking information, while the other can be adapted and configured for the viewing of other player's information. These slots can also be disposed adjacent the game board and electrically or wirelessly connected therewith to accomplish the same result. Preferably, the cards can be placed directly on a compartment when used to block others, or directly into the sensing device when used to learn a previous player's clue, and the sensing device or computing device can instruct players on the effects of the modifying card and when it should be removed from the game board, i.e., its effects may be time-limited, turn-limited, or the like.

The information uncovered by the players helps progress the game toward a desired, preselected conclusion that is typically arranged in connection with the electronic register and any associated software. For example, in preferred embodiment, the information includes clues or objects to assist the at least one player in solving a mystery. In a preferred embodiment, the locale is the scene of a mystery to be solved by a plurality of game players. Preferably, the mystery includes a murder and the answer includes the name of the murderer, the location of the murder, or the like, or any suitable combination of answers. In a preferred embodiment, the concluding icon can be arranged to be selected by a player only after a murder weapon is located by that player.

The game play can also be enhanced through various additional features. For example, a passport, cards, or dossier on each suspect can be included with the story layer and associated software, or the software can include a verbal and/or visual depiction of key information regarding each suspect in the mystery. The entire game board, or a table holding the game board, may be arranged to rotate, so that the players can rotate the game board so each active player taking a turn can see the game board from the same direction during their turn. Gaming instructions can exist in print, as well as audio, or visual format, or any combination thereof. Instructions can be arranged to be given in audio or visual fashion only with respect to a particular feature of the game, e.g., operation of the sensing device, conditions for winning, etc.

Another optional feature can include a lever or other suitable selector on the game board, on the associated electronic register, or using the sensing device, to select the difficulty level before game play begins. Preferably, a short audio narrative plays to set the scene of each story, e.g., the crime, which enhances the intrigue, suspense, and other features that complement the theme. Music can accompany the introduction, be played during certain events in the game play, or be used throughout the game play, or any combination thereof. In the case of a race-themed game, fast music can be played. In the case of a suspense-type game, the music can be higher pitched, e.g., using more stringed instruments. For a crime, the music can be more mysterious. Any suitable music to match the theme and/or story of the game can be selected and provided with the game article. Also, a "cast of characters" can be provided on the story layer or otherwise associated with the game, and a separate paper dossier can be provided if desired. Players can optionally, but preferably, elect a particular character to play using the sensing device or electronic register, or this can be accomplished automatically by the electronic register. This advantageously promotes role-playing and increases social interaction so frequently lacking in computer games.

During game play, the clues can be categorized to facilitate the action. For a mystery or crime-type game, the clues might include one or more of the following: statements, observations, facts, red herrings/false leads, or the like. Clues may be provided in various sensory formats, including sound clips, animated clips, video clips, text, illustrations, photographs, or the like, or any combination thereof. As part of the game play, each player may be able to use the sensing device to "move" a clue to confuse other players. This can be a given ability, or may be tied to certain game play events or the metallic cards previously discussed.

Game play can proceed by having the computer identify the active player, such as with sensors in the playing pieces, or the players can toggle a player-specific or a communal button as their turn ends, or the like. The associated electronic register can be arranged and configured to generate unanticipated events, unpredictable plot changes, or the like at random times. For example, an audio clip may sound asking players to change the direction of play; or that power has been lost and a virtual flashlight must be located to see further clues. A pause button for the game may also be implemented, either with hardware or as an option on the sensing device or the associated electronic register.

Conventional game play tactics may also be used if desired, such as permitting a second player landing on a first player's location can bump the first player off the board; shortcuts to different compartments or locations on the board can be implemented; multiple languages can be accounted for in game play; pre-printed paper pads optionally with pencils can be provided to assist players in tracking clues and reaching a conclusion to the game; or the like.

The term "about," as used herein, should generally be understood to refer to both numbers in a range of numerals. Moreover, all numerical ranges herein should be understood to include each tenth of an integer within the range.

EXAMPLES

This invention is illustrated by the following examples that are merely for the purpose of illustration and are not to be regarded as limiting the scope of the invention or the manner in which it can be practiced.

A gaming article was prepared according to the invention was prepared including a game board formed from an 11 inch by 14 inch WACOM sensing tablet, a paper-based electroluminescent layer, and a transparency having a printed train-appearance story layer with the train split into various train compartments for game play, each layer disposed over the other with the tablet forming the base. The sensing device was decorated physically to appear as a magnifying glass, and the LCD screen formed the visual component. The sensing device was attached by wires through a circuitry component containing the circuits needed to operate the LCD screen, and the circuitry component was attached to a home PC. Separately, the game board was formed as part of a table to inhibit sliding or motion of the game board during play. The game board was connected to the computer by USB or serial port connection. Software was loaded on the computer that coordinated clues and information to be distributed to players on the visual component of the sensing device, and the sensing device was adapted and configured to inhibit or prevent persons other than the active player from viewing the materials on the sensing device. The software was adapted to provide a murder mystery story that occurred in the train compartments depicted on the story layer.

The murder mystery arranged on the gaming article was based on a famous murder mystery story that occurred on a train.

It is to be understood that the invention is not to be limited to the exact configuration as illustrated and described herein.

Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A gaming article comprising:
   a sensing layer;
   a non-metallic, electroluminescent layer disposed over a portion of the sensing layer;
   a story layer that is at least substantially transparent and depicts a game board thereon, wherein the story layer is disposed over a portion of the electroluminescent layer; and
   a movable sensing device that is adapted to interact with the sensing layer when it is adjacent to the story layer and is adapted to transmit light therethrough from the electroluminescent layer to a player, wherein the sensing device comprises at least one input device that signals for information to be displayed through the sensing device only for the player.

2. The gaming article of claim 1, further comprising a separate computing apparatus connecting the sensing layer and the sensing device and which contains software that operates the sensing layer and device.

3. The gaming article of claim 2, wherein the separate computing apparatus is wirelessly connected to the sensing layer and sensing device.

4. The gaming article of claim 1, wherein the game board depicts a locale having separating indicators to provide separate locations thereon in which game play occurs.

5. The gaming article of claim 4, wherein the locale is the scene of a mystery to be solved by a plurality of game players.

6. The gaming article of claim 4, wherein the story layer is readily removable and replaceable with a second story layer depicting a different locale.

7. The gaming article of claim 4, wherein the game board is further depicted with a combination of alphanumeric characters, pictures, or both.

8. The gaming article of claim 1, wherein the sensing device further comprises a decorative overlay that has a complementary theme with the story layer.

9. The gaming article of claim 1, further comprising a plurality of position markers and at least one die.

10. The gaming article of claim 1, further comprising a plurality of metallic cards adapted to alter the outcome of whether the information is displayed or blocked from being displayed.

11. The gaming article of claim 1, wherein the metallic cards either:
   interfere with the sensing layer and sensing device sufficiently to block a signal therebetween when disposed on the story layer; or
   complete a circuit when placed into a suitable register connected to the sensing layer, sensing device, or both.

12. The gaming article of claim 1, wherein the sensing device comprises an LCD display with a removable polarizing filter.

13. A gaming article comprising:
   a sensing layer;
   a movable visual component disposed adjacent to the sensing layer that provides story information to a player; and
   a movable sensing device that interacts with the sensing layer when adjacent to the visual component so as to determine the story information that is to be provided to the player from the visual component and through the sensing device,
   wherein the story information is displayed on the sensing device and differs depending on the location of the sensing device in relation to the sensing layer.

14. The gaming article of claim 13, wherein the story layer depicting the game board and the visual component are disposed at least substantially horizontally.

15. A method for playing a mixed media game with at least one player, which comprises:
   moving a sensing device a predetermined number of spaces on a game board depicted on a story layer of a gaming article that has an associated electronic register;
   selecting an icon by toggling at least one input device, so as to display information from the electronic register only to the player moving the sensing device;
   repeating the moving and selecting until the player is prepared to make a conclusion; and
   selecting a concluding icon where the player selects an answer using the sensing device,
   wherein the electronic register conveys an appropriate reward to the player if the answer is correct, and determines which player of a plurality of players is selecting the icon so it can display only for that player all information previously determined by that same player when the sensing device is moved by that player across the previously visited locations on the game board.

16. The method of claim 15, wherein the game is played competitively with at least two players alternating in conducting the moving and selecting steps, wherein only one player is able to select the correct answer.

17. The method of claim 15, wherein the electronic register comprises a computer associated with at least the sensing device of the gaming article.

18. The method of claim 17, wherein a person installs software containing instructions for the associated electronic register before the at least one player begins moving the sensing device over the game board.

19. The method of claim 18, wherein a person selects a story layer that correlates to a particular story and places it on a sensing layer used in connection with the sensing device before the at least one player begins moving the sensing device.

20. The method of claim 17, wherein the information displayed to the player is determined by a combination of the at least one input device and the location of the sensing device in relation to a sensing layer disposed adjacent to the story layer.

21. The method of claim 15, wherein a tinier counts down a predetermined amount of time until the answer is selected by a first player, who must do so before the timer concludes the countdown.

22. The method of claim 16, wherein each player receives one or more modifying cards that, when used in connection with the moving and selecting steps, either blocks information in a compartment from being displayed or permits that player to see information obtained by another player.

23. The method of claim 15, wherein the number of spaces is predetermined when the player rolls one or more die on or adjacent the game board.

24. The method of claim 15, wherein the information comprises clues to assist the at least one player in solving a mystery.

25. The method of claim 24, wherein the mystery comprises a murder and the answer comprises the name of the murderer.

26. The method of claim 25, wherein the concluding icon can be selected by a player only after a murder weapon is located by that player.

* * * * *

UNITED STATES PATENT AND TRADEMARK OFFICE
CERTIFICATE OF CORRECTION

| | | |
|---|---|---|
| PATENT NO. | : 7,954,820 B2 | |
| APPLICATION NO. | : 10/841524 | |
| DATED | : June 7, 2011 | |
| INVENTOR(S) | : Bermudez et al. | |

It is certified that error appears in the above-identified patent and that said Letters Patent is hereby corrected as shown below:

Column 16, claim 21, line 44: Please change --tinier-- to "timer".

Signed and Sealed this
Ninth Day of August, 2011

David J. Kappos
*Director of the United States Patent and Trademark Office*